United States Patent
Shao

(10) Patent No.: US 6,954,307 B2
(45) Date of Patent: Oct. 11, 2005

(54) FOUR-PORT PM CIRCULATOR

(75) Inventor: Yanbin Shao, Sunnyvale, CA (US)

(73) Assignee: Oplink Communications, Inc., Fremont, CA (US)

( * ) Notice: Subject to any disclaimer, the term of this patent is extended or adjusted under 35 U.S.C. 154(b) by 56 days.

(21) Appl. No.: 10/075,433

(22) Filed: Feb. 12, 2002

(65) Prior Publication Data

US 2003/0151812 A1 Aug. 14, 2003

(51) Int. Cl.[7] .............................................. G02B 27/28
(52) U.S. Cl. ....................... 359/484; 359/483; 359/900
(58) Field of Search ................................. 359/484, 494, 359/495, 496, 497

(56) References Cited

U.S. PATENT DOCUMENTS

| | | | | |
|---|---|---|---|---|
| 4,650,289 A | * | 3/1987 | Kuwahara | 359/484 |
| 5,319,483 A | * | 6/1994 | Krasinski et al. | 398/41 |
| 5,689,593 A | * | 11/1997 | Pan et al. | 385/11 |
| 5,999,313 A | * | 12/1999 | Fukushima | 359/484 |
| 6,339,661 B1 | * | 1/2002 | Kokkelink et al. | 385/11 |
| 6,487,014 B2 | * | 11/2002 | Li | 359/484 |
| 6,680,470 B1 | * | 1/2004 | Grasser | 250/225 |
| 6,690,513 B2 | * | 2/2004 | Hulse et al. | 359/485 |
| 6,760,158 B1 | * | 7/2004 | Cao | 359/497 |
| 2003/0103265 A1 | * | 6/2003 | Gu | 359/484 |

FOREIGN PATENT DOCUMENTS

| | | | |
|---|---|---|---|
| JP | 61-038934 A | * | 2/1986 |
| JP | 06-324289 A | * | 11/1994 |
| JP | 09-133894 A | * | 5/1997 |
| JP | 9-133894 | | 5/1997 |
| JP | 09-258135 A | * | 10/1997 |
| JP | 09-258136 A | * | 10/1997 |
| JP | 11-052297 A | * | 2/1999 |
| WO | WO/99/12061 | | 3/1999 |

OTHER PUBLICATIONS

PTO 03–4026, "Optical Path Switch", English–language translation of Japanese Patent Sho 61–38934 published Feb. 25, 1986. Translated by Schreiber Translations, Inc (Jun.–2003).*

* cited by examiner

*Primary Examiner*—John Juba, Jr.
(74) *Attorney, Agent, or Firm*—Fish & Richardson P.C.

(57) ABSTRACT

A circulator includes a polarization beam splitter, a first reflector, a first non-reciprocal device, a second non-reciprocal device, and a second reflector. The first reflector is coupled with the polarization beam splitter. The first non-reciprocal device is coupled to the first reflector. The second non-reciprocal device is coupled to the polarization beam splitter. The second reflector is coupled with the polarization beam splitter.

13 Claims, 4 Drawing Sheets

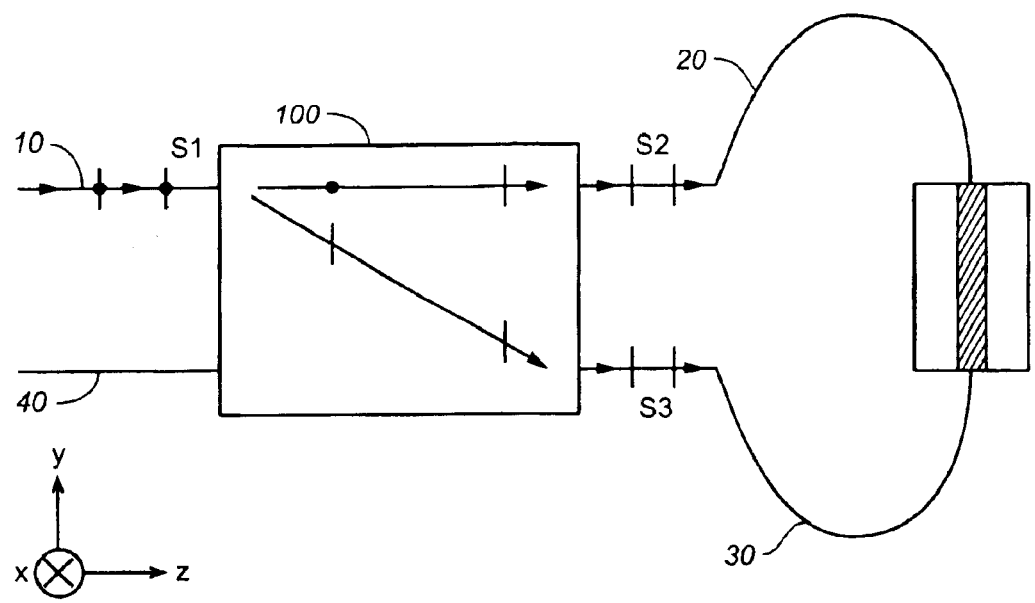
FIG._1A
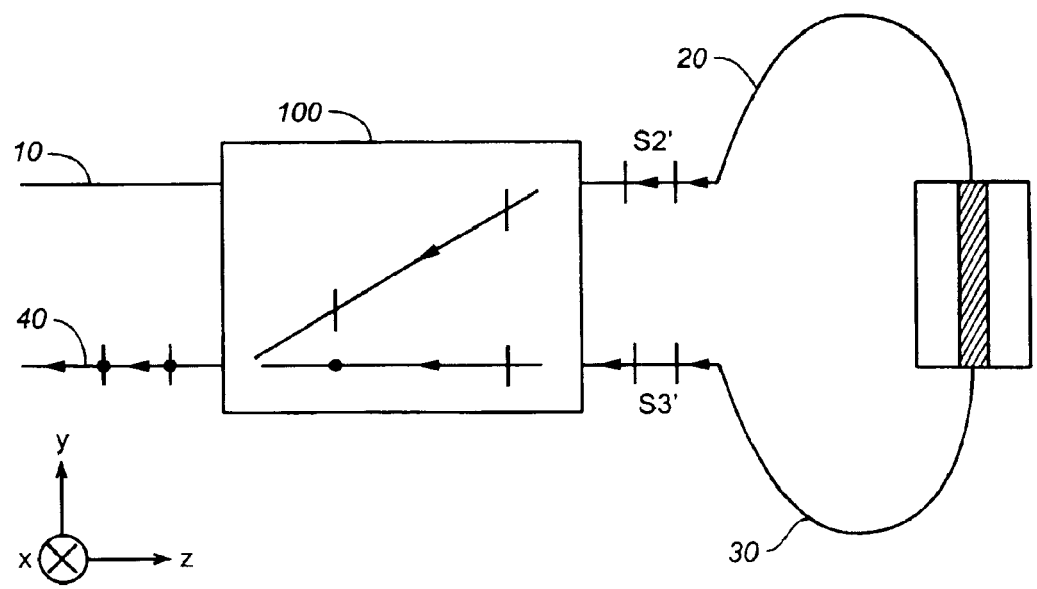
FIG._1B

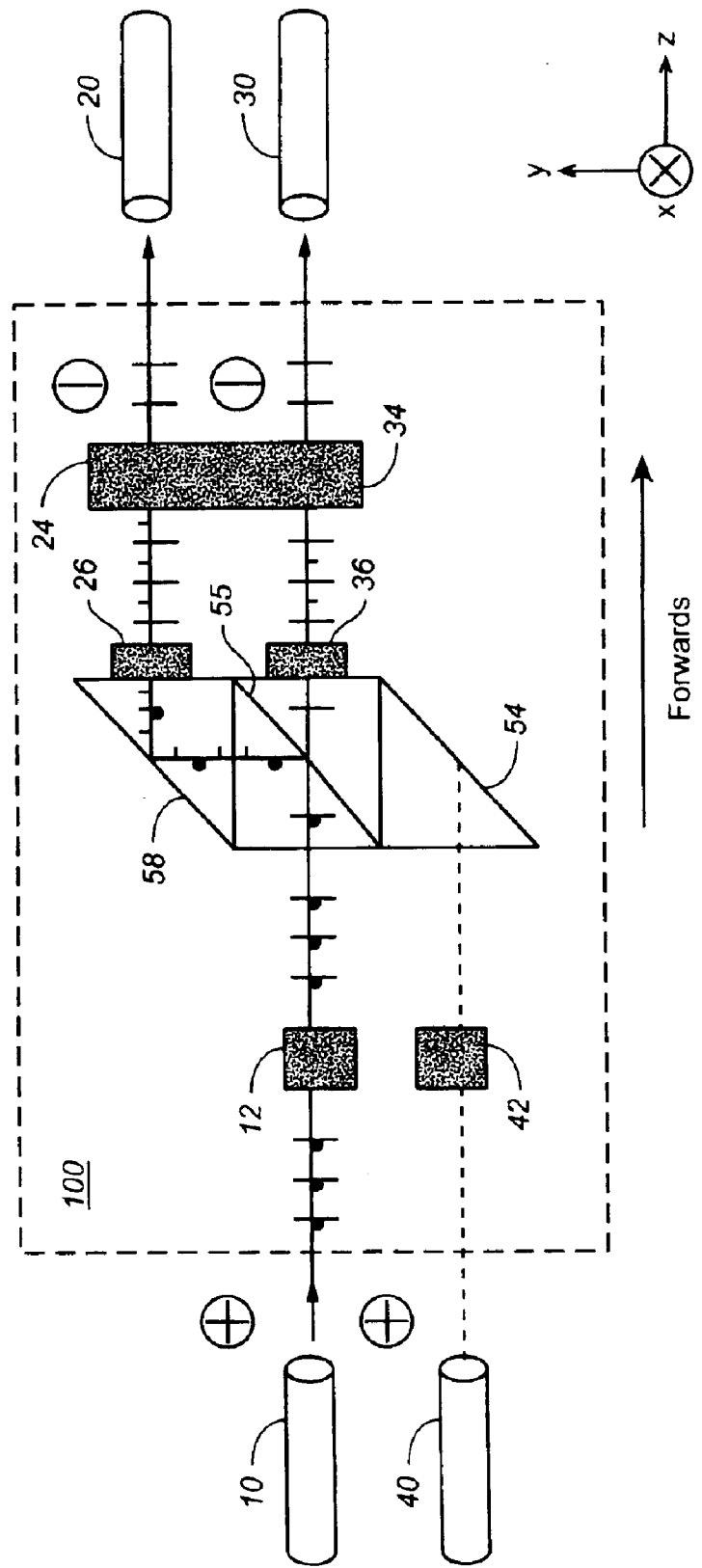
FIG._2A

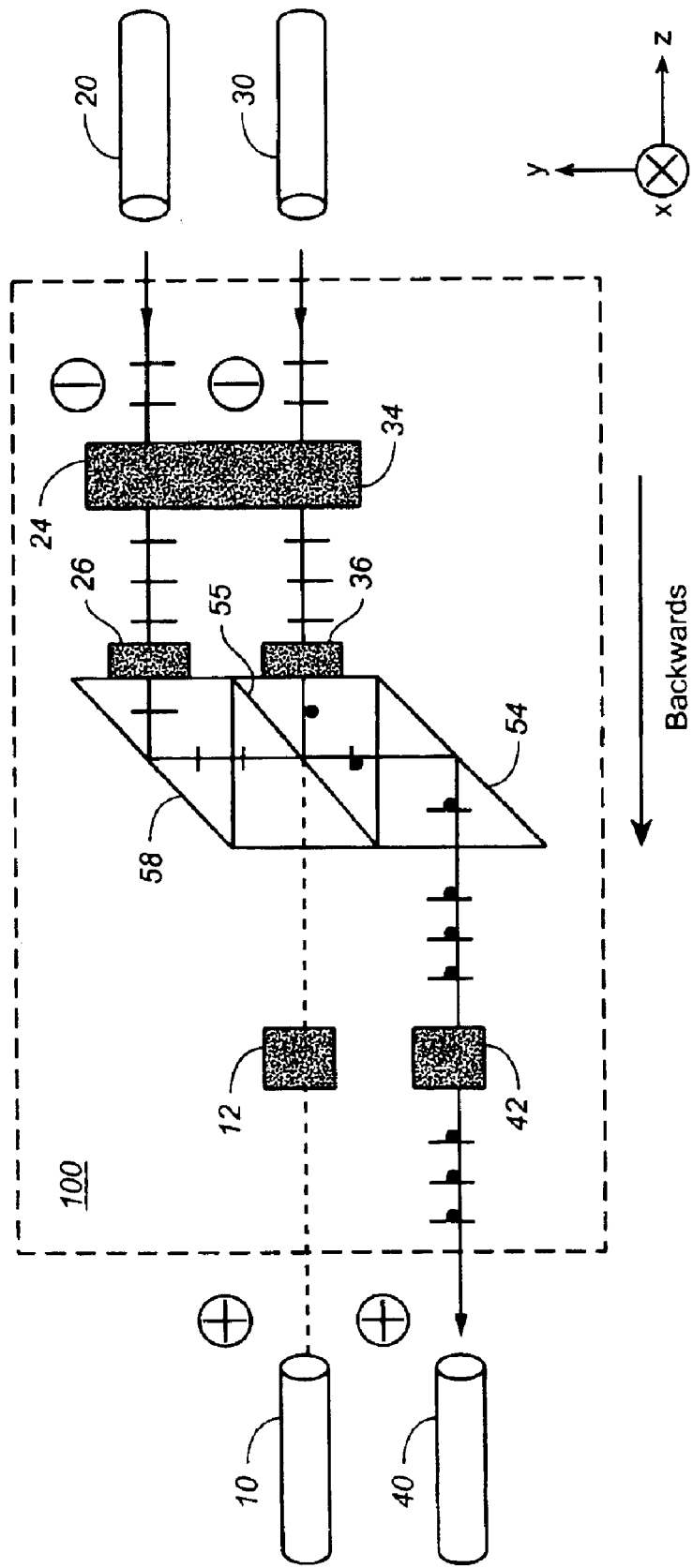
FIG._2B

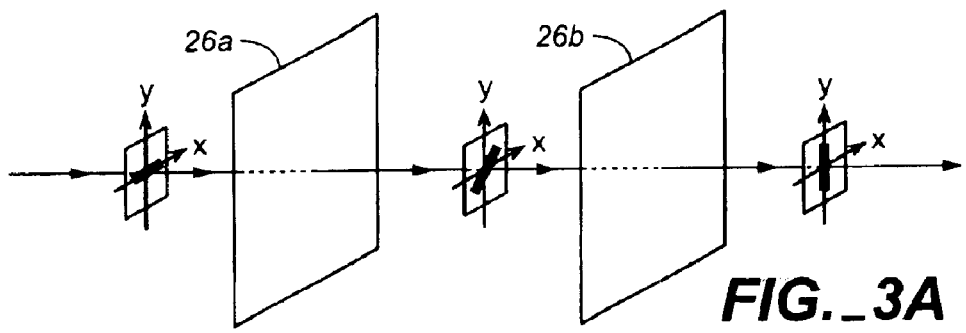
FIG._3A
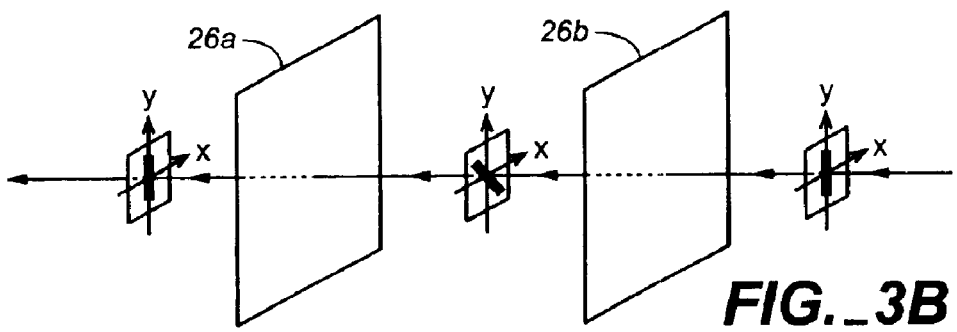
FIG._3B
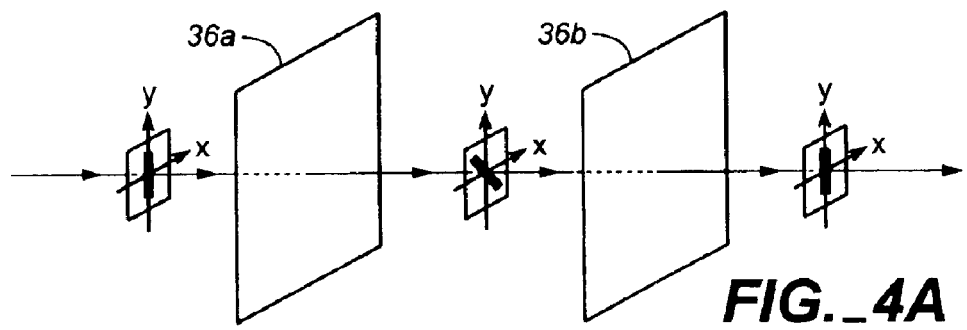
FIG._4A
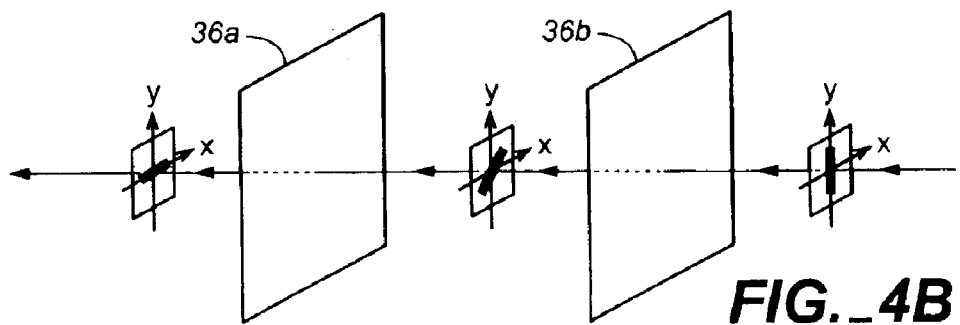
FIG._4B

FOUR-PORT PM CIRCULATOR

BACKGROUND OF THE INVENTION

A circulator is often used with other optical devices to achieve certain optical functions. For example, a circulator can be used with a Brag Grating to extract an optical signal with a particular wavelength from a WDM optical signal. When an optical device such as a Brag Grating is manufactured using a Planar Lightwave Circuit ("PLC") or optical waveguide technologies, the optical device can become polarization sensitive. One method of using a PLC as a polarization insensitive device is to combine the PLC with a Polarization Maintenance ("PM") circulator. FIGS. 1a and 1b illustrate a four-port PM circulator 100 coupled to a PLC 60 through two PM fibers 20 and 30.

As shown in FIG. 1a, a randomly polarized signal S1, received from optical fiber 10, enters port one of PM circulator 100, and is separated into two light signals S2 and S3. Signal S2 exits from port 2 of PM circulator 100 with the y-polarization and enters PM fiber 20. Signal S3 exits from port 3 of PM circulator 100 with the y-polarization and enters PM fiber 30. Signals S2 and S3 are transmitted into PLC 60 through PM fibers 20 and 30 respectively.

As shown in FIG. 1b, optical signal S2' with the y-polarization, received from PLC 60 through PM fiber 20, enters port two of PM circulator 100, and exits from port four of PM circulator 100 as a first component of signal S4 with the y-polarization. Optical signal S3' with the y-polarization, received from PLC 60 through PM fiber 30, enters port 3 of PM circulator 100, and exits from port four of PM circulator 100 as a second component of signal S4 with the x-polarization. Combining the first and second components produce signal S4 with a random polarization.

SUMMARY OF THE INVENTION

In one aspect, the invention provides a four-port circulator. The four-port circulator includes a polarization beam splitter, a first reflector, a first non-reciprocal device, a second non-reciprocal device, and a second reflector. The first reflector is coupled to the polarization beam splitter. The first non-reciprocal device is coupled to the first reflector. The second non-reciprocal device is coupled to the polarization beam splitter. The second reflector is coupled to the polarization beam splitter.

In another aspect, the invention provides a method for transmitting light among a first port, a second port, a third port, and a fourth port. The light has either a first polarization or a second polarization. The method includes the step of forwarding a first light signal received from the first port with the first polarization to a polarization beam splitter. The method includes the step of directing the first light signal to a first reflector. The method includes the step of reflecting the first light signal to a first non-reciprocal device. The method includes the step of changing the polarization of the first light signal from the first polarization to a second polarization. The method includes the step of directing the first light signal to the second port.

Aspects of the invention can include one or more of the following advantages. A four-port circulator is provided that may be constructed with a small number of sub-components. A four-port circulator is provided that may have low cost to manufacture. Other advantages will be readily apparent from the attached figures and the description below.

BRIEF DESCRIPTION OF THE DRAWINGS

FIGS. 1a and 1b illustrate a four-port PM circulator coupled to a Planar Lightwave Circuit through PM fibers.

FIG. 2a illustrates light received from fiber 10 with the x-polarization and the y-polarization is directed to fibers 20 and 30 respectively with the y-polarization.

FIG. 2b illustrates light received from fiber 20 and 30 with the y-polarization is directed to fiber 20 with the y-polarization and the x-polarization respectively.

FIG. 3a and FIG. 3b illustrate non-reciprocal device 26 that includes half wave plate 26a and Faraday rotator 26b.

FIG. 4a and FIG. 4b illustrate non-reciprocal device 36 that includes half wave plate 36a and Faraday rotator 36b.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principles herein may be applied to other embodiments. Thus, the present invention is not intended to be limited to the embodiments shown, but is to be accorded the widest scope consistent with the principles and features described herein.

The present invention will be described in terms of a four-port PM circulator having specific components having a specific configuration. Similarly, the present invention will be described in terms of four-port PM circulator components having specific relationships, such as distances or angles between components. However, one of ordinary skill in the art will readily recognize that this method and system will operate effectively for other components having similar properties, other configurations, and other relationships between components.

FIGS. 2a and 2b illustrate an implementation of a four-port PM circulator 100. Circulator 100 is coupled to four-optical fibers 10, 20, 30 and 40. Circulator 100 includes Polarization Beam Splitter ("PBS") 55, reflectors 54 and 58, non-reciprocal devices 26 and 36, and polarizers 24 and 34. Circulator 100 can optionally include isolators 12 and 42. For the convenience of the presentation, a coordinate with x, y and z axis is shown in FIGS. 2a and 2b.

Circulator 100 performs two functions. The first function is illustrated in FIG. 2a: light from optical fiber 10 entering circulator 100 with the x-polarization is directed to enter optical fiber 20 with the y-polarization, and light from optical fiber 10 entering circulator 100 with the y-polarization is directed to enter optical fiber 30 with the y-polarization. The second function is illustrated in FIG. 2b: light from optical fiber 20 entering circulator 100 with the y-polarization is directed to enter optical fiber 40 with the y-polarization, and light from optical fiber 30 entering circular 100 with the y-polarization is directed to enter optical fiber 40 with the x-polarization.

Referring to FIG. 2a, light with random polarization enters circulator 100 from fiber 10, passes through isolator 12, and is incident upon PBS 55 in the positive z-direction.

Light incident upon PBS 55 with the y-polarization passes through PBS 55, non-reciprocal device 36, polarizer 34, and enters optical fiber 30 with the y-polarization. When the light passes through non-reciprocal device 36, the polarization of the light remains unchanged.

Light incident upon PBS 55 with the x-polarization is reflected by PBS 55 in the positive y-direction with the x-polarization. The light traveling in the positive y-direction is reflected by reflector 58 in the positive z-direction, enters non-reciprocal device 26 with the x-polarization, and exits from non-reciprocal device 26 with the y-polarization. The light received from non-reciprocal device 26 passes through polarizer 24, and enters optical fiber 20 with the y-polarization.

Referring to FIG. 2b, light with the y-polarization enters circulator 100 from fiber 20, passes through polarizer 24, enters non-reciprocal device 26 with the y-polarization, and exits from non-reciprocal device 26 with the y-polarization. Light received from non-reciprocal device 26 with the y-polarization is reflected by reflector 58 in the negative y-direction with the z-polarization. Light received from reflector 58 passes through PBS 55 with the z-polarization, is reflected by reflector 54 in the negative z-direction with the y-polarization, passes through isolator 42, and enters optical fiber 40 with the y-polarization.

Referring still to FIG. 2b, light with the y-polarization enters circulator 100 from fiber 30, passes through polarizer 34, enters non-reciprocal device 36 with the y-polarization, and exits from non-reciprocal device 36 with the x-polarization. Light received from non-reciprocal device 36 with the x-polarization is reflected by PBS 55 in the negative y-direction, and is reflected again by reflector 54 in the negative z-direction. The light received from reflector 54, passes through isolator 42, and enters optical fiber 40 with the x-polarization.

Isolators 12 and 42 may optionally be included to block light. Isolator 12 allows light traveling in the positive z-direction to pass though, but blocks light traveling in the negative z-direction. Isolator 42 allows light traveling in the negative z-direction to pass though, but blocks light traveling in the positive z-direction.

Polarizers 24 and 34 are used to align the polarization of light beams. Light traveling in the positive z-direction, after passing though polarizer 24 or 34 and before entering optical fiber 20 or 30, is substantially aligned with the y-polarization. Light traveling in the negative z-direction, after passing though polarizer 24 or 34 and before being incident upon reflector 58 or PBS 55, is substantially aligned with the y-polarization as well. Polarizers 24 and 34 can be of the form of POLARCOR™ manufactured by Corning Inc.

Non-reciprocal device 26 is constructed in such a way that the polarization of light passing though the non-reciprocal device in the positive z-direction will be rotated 90 degrees, and the polarization of light passing though the non-reciprocal device in the negative z-direction will remain unchanged. Non-reciprocal device 36 is constructed in such a way that the polarization of light passing though the non-reciprocal device in the negative z-direction will be rotated 90 degrees, and the polarization of light passing though the non-reciprocal device in the positive z-direction will remain unchanged.

As shown in FIGS. 3a and 3b, non-reciprocal device 26 can be constructed with half wave plate ("HWP") 26a and Faraday rotator 26b. HWP 26a can have its optical axis at an angle of 22.5 degrees angle with respect to the x-direction. Faraday rotator 26b can be constructed in such a way that the polarization of a light beam traveling in either the positive z-direction or negative z-direction will be rotated +45 degrees with respect to the positive z-axis.

Referring to FIG. 3a, light enters HWP 26a in the positive z-direction with the x-polarization, exits from HWP 26a with the x+y polarization, enters Faraday rotator 26b with the x+y polarization, and exits from Faraday rotator 26b with the y-polarization.

Referring to FIG. 3b, light enters Faraday rotator 26b in the negative z-direction with the y-polarization, exits from Faraday rotator 26b with the x-y polarization, enters HWP 26a with the x-y polarization, and exits from HWP 26a with the y-polarization.

In an alternative implementation, the position of HWP 26a and Faraday rotator 26b can be exchanged.

Non-reciprocal device 36 can be constructed with a HWP 36a and Faraday rotator 36b, as shown in FIGS. 4a and 4b. HWP 36a can have its optical axis at an angle of 22.5 degrees with respect to the x-direction. Faraday rotator 36b is constructed in such a way that the polarization of a light beam traveling in either the positive z-direction or negative z-direction will be rotated −45 degrees with respect to the positive z-axis.

Referring to FIG. 4a, light enters HWP 36a in the positive z-direction with the y-polarization, exits from HWP 36a with the x-y polarization, enters Faraday rotator 36b with the x-y polarization, and exits from Faraday rotator 36b with the y-polarization.

Referring to FIG. 4b, light enters Faraday rotator 36b in the negative z-direction with the y-polarization, exits from Faraday rotator 36b with the x+y polarization, enters HWP 36a with the x-y polarization, and exits from HWP 36a with the y-polarization.

In an alternative implementation, the position of HWP 36a and Faraday rotator 36b can be exchanged.

A method and system has been disclosed for providing a four-port PM circulator. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A circulator comprising:
   a first input port operable to receive light including a first and a second component having a first and a second polarization, respectively;
   a polarization beam splitter optically coupled to the first input port and operable to reflect the first component of light transmitted from the first input port having the first polarization and pass the second component of light transmitted from the first input port having the second polarization;
   a reflector optically coupled to the polarization beam splitter;
   a non-reciprocal device optically coupled to the reflector and operable to convert the first component of light of the first polarization into light of the second polarization;
   a first output port operable to receive the first component of light of the second polarization from the non-reciprocal device; and
   a second output port operable to receive the second component of light of the second polarization from the polarization beam splitter substantially contemporaneously in time with the receipt of the first component of light at the first output port.

2. The circulator of claim 1, further comprising an isolator optically coupled to the polarization beam splitter.

3. The circulator of claim 1, further comprising a polarizer optically coupled to the non-reciprocal device.

4. The circulator of claim 1, further comprising an isolator optically coupled to the reflector.

5. The circulator of claim 1, wherein the non-reciprocal device includes a half wave plate and a Faraday rotator.

6. A method for transmitting light among a first input port, a first output port, and a second output port, the light having either a first polarization or a second polarization, the method comprising:

transmitting a light signal including a first and a second component having a first and second polarization, respectively, from the first input port onto a polarization beam splitter as light having both the first and the second polarization;

directing the first component of light onto a first reflector;

reflecting the first component of light onto a first non-reciprocal device;

changing the polarization of the first component of light from the first polarization to a second polarization;

directing the first component of light into a first output port solely as light of the second polarization;

directing the second component of light onto a second non-reciprocal device;

maintaining the polarization of the second component of light as the second component passes through the second non-reciprocal device; and directing the second component of light into the second output port substantially contemporaneously in time with the directing of the first component of light into the first output port solely as light of the second polarization.

7. The method of claim 6, wherein directing the first component of light into the first output port includes:

directing the first component of light into the first output port through a polarizer.

8. The method of claim 6, wherein directing the second component of light into the second output port includes:

directing the second component of light into the second output port through a polarizer.

9. The method of claim 6, wherein transmitting a first and a second component of light onto a polarization beam splitter includes:

sending the first and the second component of light onto a polarization beam splitter through an isolator.

10. A circulator, comprising:

first and second input ports, the first input port being operable to receive a first light signal of a first polarization and the second input port being operable to receive a second light signal of the first polarization a receipt of both being substantially contemporaneously in time;

a first reflector optically coupled to the first input port;

a non-reciprocal device optically coupled to the second input port and operable to convert the second light signal of the first polarization into a second light signal of a second polarization;

a polarization beam splitter optically coupled to the first reflector and to the non-reciprocal device, and operable to pass light of the first polarization and reflect light of the second polarization;

a second reflector optically coupled to the polarization beam splitter, the second reflector being operable to maintain a polarization of the first and the second light signals; and an output port optically coupled to the second reflector and operable to receive the first light signal of the first polarization and the second light signal of the second polarization.

11. The circulator of claim 10, further comprising a polarizer optically coupled to the non-reciprocal device.

12. The circulator of claim 10, further comprising an isolator optically coupled to the second reflector.

13. The circulator of claim 10, wherein the non-reciprocal device includes a half wave plate and a Faraday rotator.

* * * * *